UNITED STATES PATENT OFFICE.

JOSEPH GROTTENTHALER, OF ALLEGHENY, PENNSYLVANIA, ASSIGNOR OF ONE-HALF TO PHILLIP J. HUBER AND WILLIAM P. KOONSMAN, BOTH OF SAME PLACE.

MANUFACTURE OF IRON AND STEEL.

SPECIFICATION forming part of Letters Patent No. 311,830, dated February 3, 1885.

Application filed September 1, 1884. (Specimens.)

*To all whom it may concern:*

Be it known that I, JOSEPH GROTTENTHALER, of Allegheny, in the county of Allegheny and State of Pennsylvania, have invented certain new and useful Improvements in the Manufacture of Iron and Steel; and I do hereby declare that the following is a full, clear, and exact description of the invention, which will enable others skilled in the art to which it appertains to make and use the same.

Among the many methods of purifying and decarburizing iron, the process of puddling is widely practiced, although it is an operation requiring great skill, experience, and manual dexterity, and is essentially a slow and expensive process.

My invention consists in the process of purifying and decarburizing iron consisting in melting the iron, adding sulphur to the same, and mixing it therewith by puddling, as hereinafter set forth and claimed.

It has never been proposed to decarburize iron, so far as I am aware, by the addition to the mass of molten iron of this supposably deleterious substance. I have discovered that when iron has been melted in a crucible, pot, or furnace, carbon present may be reduced to any desired degree by the addition to the molten mass of iron of a certain per cent. of sulphur. I have further found that the oxygen and phosphorus present may be removed by the same operation.

My invention relates to the manufacture of iron and steel, and has for its object the provision of means whereby iron high in carbon may be decarburized in an effective and economical manner for the production of steel, steely iron, soft iron, or other forms of iron low in carbon, and at the same time freed from impurities.

My invention consists, broadly, in the method of decarburizing iron consisting in adding sulphur to the iron while the latter is in a molten condition and incidentally thereto in purifying the same.

In carrying my invention into effect I prefer to melt the iron to be decarburized in an ordinary puddling-furnace, and while it is in a molten condition, and after ebullition has ceased, to add to the mass a proportion of sulphur, varying in quantity according as steel or iron lower in carbon than steel is to be produced, the sulphur being intermixed and brought into intimate contact with the iron by puddling if it is desired to produce iron of a very pure quality. From experiment I am led to believe that the sulphur not only combines with the carbon present in the iron to form a sulphide of carbon, which passes off as a vapor, but also unites with the phosphorus to form a volatile fluid, which also passes off in the form of vapor. It is a generally accepted theory that the cold shortness of iron is due to the presence of oxygen or oxide, and as the affinity of oxygen for sulphur is considerable, I am led to believe that where sulphur is added to molten iron the sulphur combines with the oxygen and the resulting compound passes off as a vapor or gas. It will thus be seen that I accomplish a threefold purpose—to wit, the removal of a proportion of the carbon, the removal of phosphorus, and the removal of deleterious oxide—by the single act of adding sulphur to the molten iron.

I am aware that it is not new in the manufacture of iron or steel to add certain compounds of sulphur to the molten mass for the purpose of producing iron containing sulphur. I therefore do not claim the addition of sulphur compounds to a mass of molten iron, as I propose to use only sulphur in its pure state for the purpose of deoxidizing and purifying the iron or steel.

I am aware that the use of sulphur has been suggested as a substitute for or addition to charcoal, coke, anthracite and bituminous coals used as fuel in the manufacture of blooms, with the design of imparting to the iron certain working qualities; but this use is not in keeping with the purpose of my invention, nor is it the same application.

Having described my invention, I claim—

The process of purifying and decarburizing iron consisting in melting the iron, adding sulphur to the same, and mixing it therewith by puddling, substantially as described.

In testimony that I claim the foregoing as my own I have hereto affixed my signature in presence of two witnesses.

JOSEPH GROTTENTHALER.

Witnesses:
JOS. B. CONNOLLY,
ALVA A. MOORE.